B. F. SPARR.
COUPLING.
APPLICATION FILED FEB. 5, 1910.
971,321.
Patented Sept. 27, 1910.
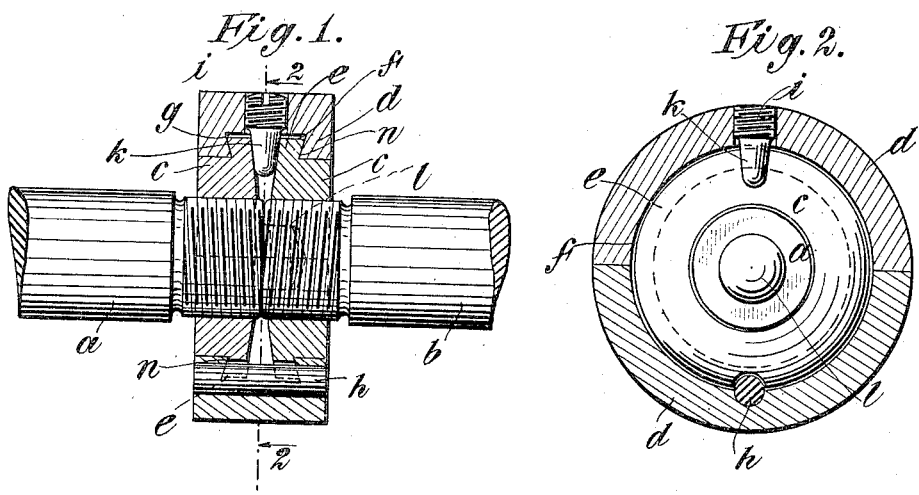
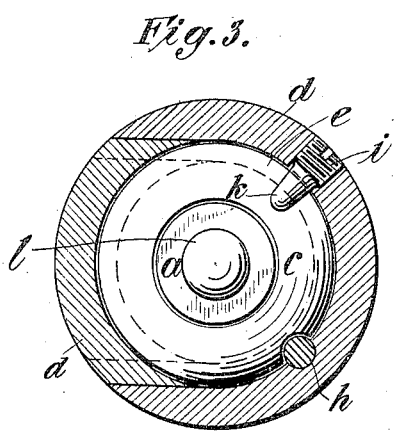

UNITED STATES PATENT OFFICE.

BENJAMIN F. SPARR, OF NEW YORK, N. Y.

COUPLING.

971,321.  Specification of Letters Patent.  Patented Sept. 27, 1910.

Application filed February 5, 1910. Serial No. 542,168.

*To all whom it may concern:*

Be it known that I, BENJAMIN F. SPARR, a citizen of the United States, and a resident of the borough of Brooklyn, of the city of New York, in the State of New York, whose post-office address is No. 341 Hancock street, in said borough of Brooklyn, have made certain new and useful Improvements in Couplings, of which the following is a specification, reference being had to the accompanying drawings, forming a part hereof.

The object of the invention is to provide a device for coupling together a divided shaft or for rigidly uniting any two members occupying substantially the same relation to each other as the two parts of a divided shaft. It often happens in the construction and assembling of machinery and mechanism of various sorts that shafts and the like have to be provided, or are preferably provided, in two or more parts which are required to be united in the completed mechanism; and in most instances where such is the case, the coupling of the two parts has to be done without slipping or sliding the coupling parts over the shaft or other device. The present improvements have been devised to meet cases like those just referred to and also to provide a quick and convenient means of uniting any two such members, whatever their particular conditions of use may require.

In the drawings, where a convenient and practical embodiment of the invention is illustrated as applied to shafts, Figure 1 is a view of the coupling in section, taken longitudinally of the shaft. Fig. 2 is a similar view, but with the plane of section at right angles to that of Fig. 1, and, Fig. 3 is a view in section, showing a modification.

The two parts of the shaft, that is, the two members or bases to be coupled, are shown at *a* and *b*. Their abutting ends are threaded and they are provided with nuts *c* which constitute fastening means for a divided ring *d;* the latter envelops the nuts and is adapted to be rigidly secured thereto. The fastening of the ring to the nuts is effected by threading the two shaft parts differentially and by providing the nuts with peripheral flanges *e*, undercut as at *n*, so that when the nuts are rotated the same way they may be moved in opposite directions with the result that said flanges may be made to tightly grip the sides of a recess *f* in the inner periphery of the ring. The recess in the latter is so constructed that the flanges, when the nuts are in close proximity, will readily fit into the same, and its sides are also preferably undercut, as at *g*, so as to fit squarely upon the outward sides of the flanges *e* when the nuts are separated. It will be understood, of course, that one of the nuts might be made fast to the corresponding base member or shaft part, so long as the other nut has movement relative thereto, but I prefer to make the device as shown with two nuts differentially threaded to the two base members. It will be obvious that the rotation of the nuts in one direction will separate the nuts while rotation in the reverse direction will bring them together and enable the device to be disassembled.

Ordinarily, the friction between the outer ring *d* and the nuts *c* will be sufficient to cause the nuts to rotate in the same direction that the ring is turned. But, if desired, a key *h* may be provided, preferably set in the outer ring *d* as shown, and, when the ring is inserted in position, lying in a groove formed in the flanges of the nuts. When the latter are expanded against the ring so that the parts are in the position shown in Fig. 1, then the whole structure will be perfectly rigid. In this position it is preferable to insert a key or wedge between the nuts so that they cannot possibly approach each other or the device be accidentally loosened. Such a key may be formed by a screw *i* threaded into the ring *d* and having a cone-shaped shank *k*.

If desired, one of the base members or shaft parts may have a projecting end *l* which fits into a corresponding recess in the opposing end of the other base member or shaft part, thus making the shaft practically continuous, and relieving the coupling of considerable strain. It will be understood, too, that the outer ring *d* may be made in any desired shape, as for instance to constitute a fly wheel or a pulley, and thus may be made to serve any useful purpose to which it may be adapted. Finally, in Fig. 2 the outer ring *d* is shown as divided in equal parts, but, obviously, as shown in Fig. 3, it may be otherwise divided if desirable.

Various other changes may be made without departing from the spirit of the invention.

I claim as my invention:

1. The combination with two members to be coupled, of nuts threaded thereto respectively so as to move in opposite directions when rotated the same way, and a divided member adapted to fit around said nuts and to be engaged thereby when the nuts are rotated to move them apart.

2. The combination with two members to be coupled, and one of which has a projecting end fitting into the end of the other, of nuts threaded thereto respectively so as to move in opposite directions when rotated the same way, and a divided member adapted to fit around said nuts and to be engaged thereby when the nuts are rotated to move them apart.

3. The combination with two members to be coupled, of nuts threaded thereto respectively so as to move in opposite directions when rotated the same way, and a divided ring having a recess around its inner periphery into which said nuts are adapted to project.

4. The combination with two members to be coupled, of nuts threaded thereto respectively so as to move in opposite directions when rotated the same way, said nuts having projecting undercut flanges, and a divided ring having a recess with undercut sides and in which said flanges are adapted to fit so as to engage said sides.

5. The combination with two members to be coupled, of nuts threaded thereto respectively so as to move in opposite directions when rotated the same way, said nuts having projecting undercut flanges, a divided ring having a recess with undercut sides and in which said flanges are adapted to fit so as to engage said sides, and a separating member for the nuts.

6. The combination with two members to be coupled, of nuts threaded thereto respectively so as to move in opposite directions when rotated the same way, said nuts having projecting undercut flanges, a divided ring having a recess with undercut sides and in which said flanges are adapted to fit so as to engage said sides, and a wedge member threaded into the ring and adapted to lock the nuts.

7. The combination with two members to be coupled, one of which has a projecting end fitting into the end of the other, of a divided member, nuts threaded respectively to said two members to be coupled and adapted to engage the divided member when rotated to move them apart.

8. The combination with two members to be coupled, of nuts threaded thereto respectively so as to move in opposite directions when rotated the same way, a divided member adapted to fit around said nuts and to be engaged thereby when the nuts are rotated to move them apart, and a key fitted between said nuts and the divided member, said nuts having seats within which the key fits whereby as the divided member is rotated, the nuts will be rotated uniformly through the medium of the key.

This specification signed and witnessed this 3rd day of February, A. D., 1910.

BENJAMIN F. SPARR.

Signed in the presence of—
JOHN W. THOMPSON,
G. McGRANN.